Jan. 22, 1952  A. J. BERGERON  2,583,203
AUTOMATIC POULTRY FEEDER
Filed June 2, 1948  3 Sheets-Sheet 1

INVENTOR.
Arthur J. Bergeron
BY Victor J. Evans & Co.
ATTORNEYS

Jan. 22, 1952 A. J. BERGERON 2,583,203
AUTOMATIC POULTRY FEEDER
Filed June 2, 1948 3 Sheets-Sheet 2

INVENTOR.
Arthur J. Bergeron
BY Victor J. Evans & Co.
ATTORNEYS

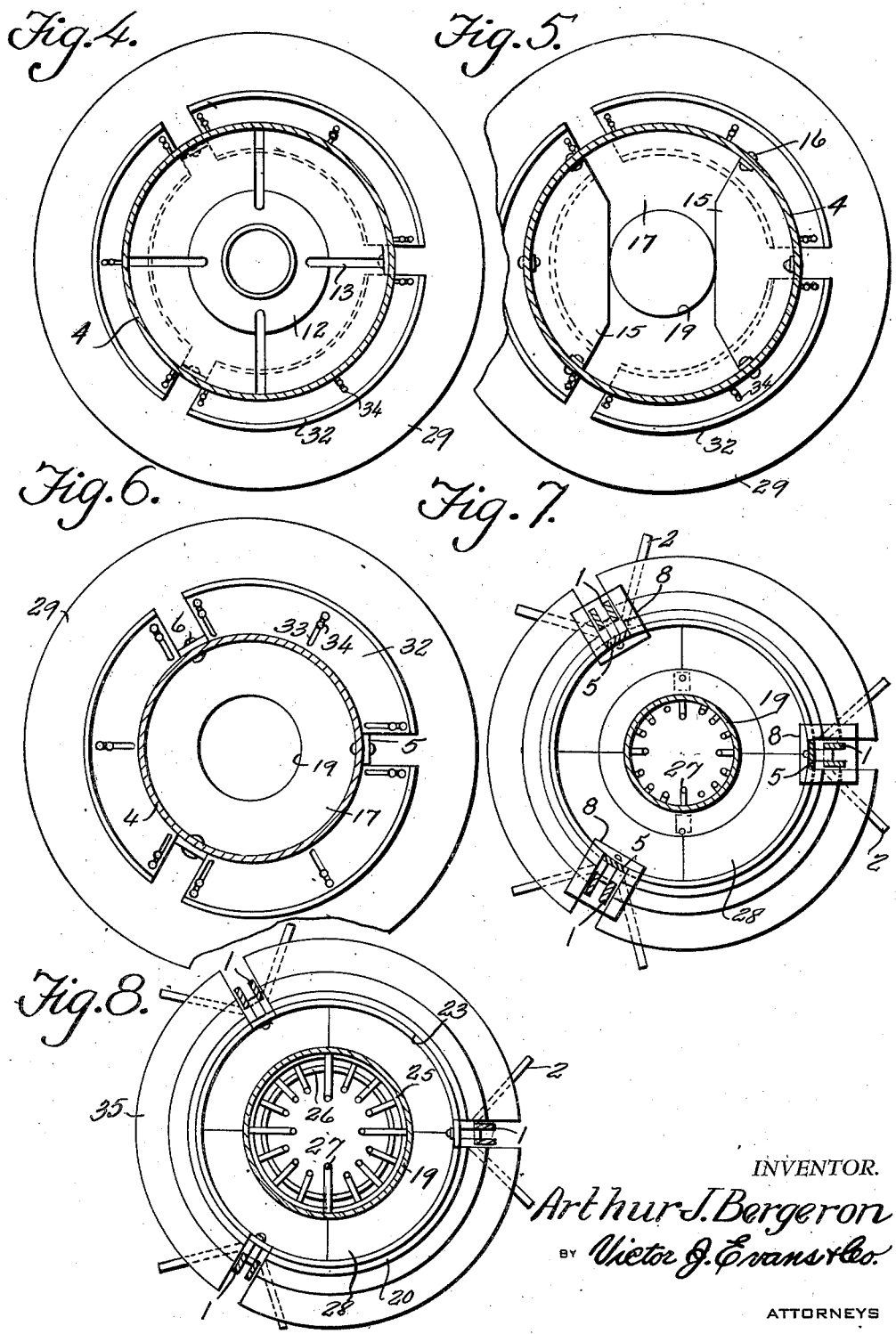

Patented Jan. 22, 1952

2,583,203

UNITED STATES PATENT OFFICE 2,583,203

AUTOMATIC POULTRY FEEDER

Arthur J. Bergeron, Kittery, Maine

Application June 2, 1948, Serial No. 30,662

3 Claims. (Cl. 119—51)

The present invention relates to the general class of animal husbandry, including animal controlled and agitated feeding devices, hoppers, and troughs, and more specifically to an improved automatic poultry feeder of the gravity feed type, and adapted for use with various kinds of dry feeds, granular feeds, mash, etc., and adapted for use in a brood house, a hen house, and for outdoor use as on a range. Means are provided for vertically adjusting the feeding implement from the ground or floor level to variable heights in adapting the feeding assembly for birds of varying heights; and means are provided for cascading the feed deposited in the hopper and supplying the feed to the feeding assembly in condition for ready access to the poultry.

The primary object of the invention is the provision of a poultry feeder that is composed of a minimum number of parts that may be manufactured with facility and low cost of production, the parts may be assembled with convenience; and the resulting appliance is durable, sanitary, simple in operation, compact in arrangement, and efficient in the performance of its functions.

The invention consists in certain novel combinations and arrangements of parts as will hereinafter be described, and more particularly set forth in the appended claims. In the accompanying drawings I have illustrated a complete example of a physical embodiment of my invention wherein the parts are combined and arranged in accord with one mode I have devised for the practical application of the principles of my invention. It will be understood however that changes and alterations are contemplated and may be made in these exemplifying drawings and mechanical structures, within the scope of my claims, without departing from the principles of the invention.

Figure 4 is a transverse sectional view at line 4—4 of Fig. 3 through the hopper showing the material spreader.

Figure 5 is a transverse sectional view at line 5—5 of Fig. 3 showing the guide fins or distributing shelves for the material, as it is deposited in the feed hopper or magazine.

Figure 6 is a transverse sectional view at line 6—6 of Fig. 3 through the bottom portion of the hopper.

Figure 3:
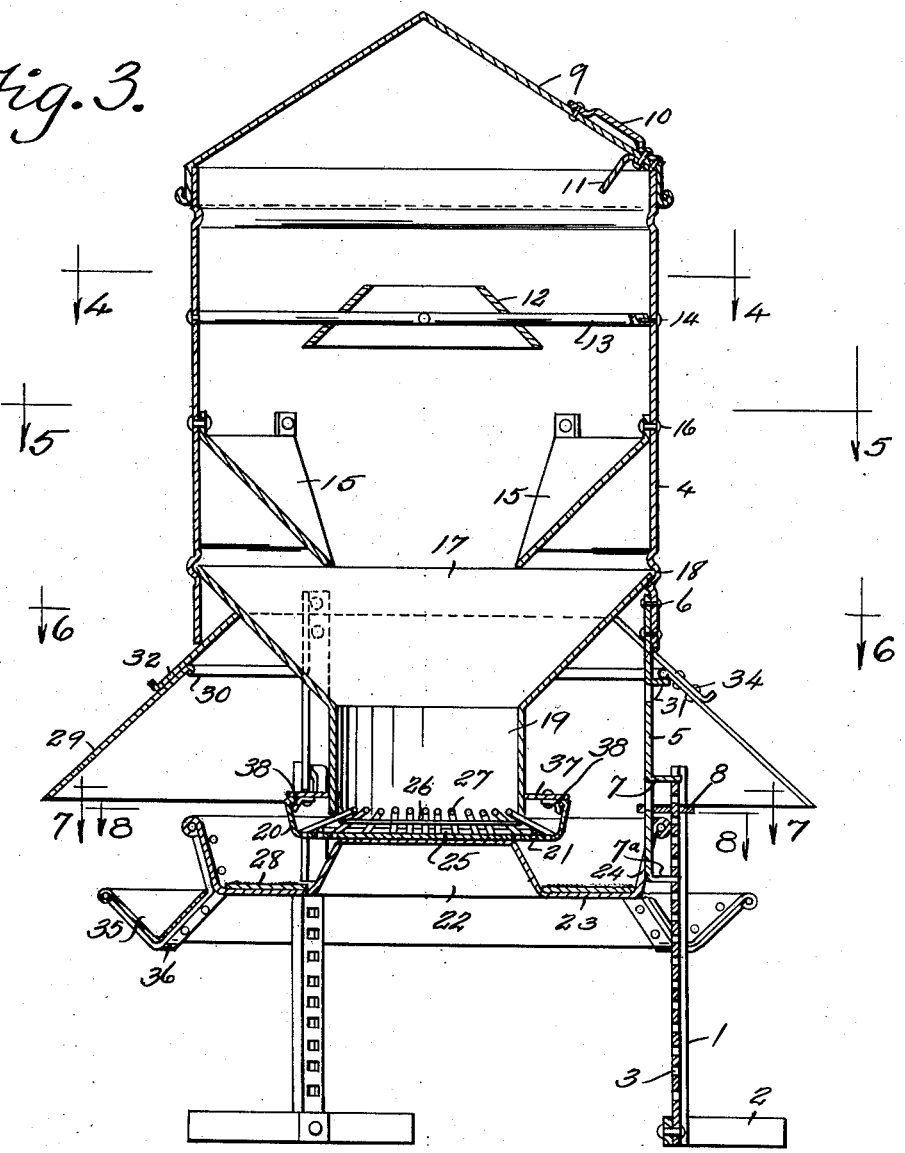
Figure 3 is an enlarged vertical sectional view of the appliance at line 3—3 of Fig. 1.

Figures 7 and 8 are respectively transverse sectional views at lines 7—7 and 8—8 of Fig. 3.

Figure 9:
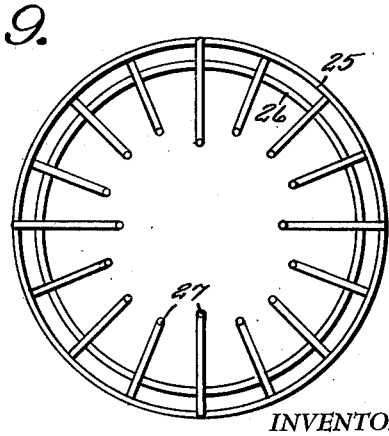
Figure 10:
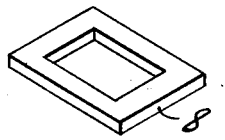

Figure 9 is an enlarged detail plan view of the feed agitator removed from the feed pan; and Figure 10 is a perspective view of an open center cam plate for locking the adjustable supports of the hopper.

Figure 1:
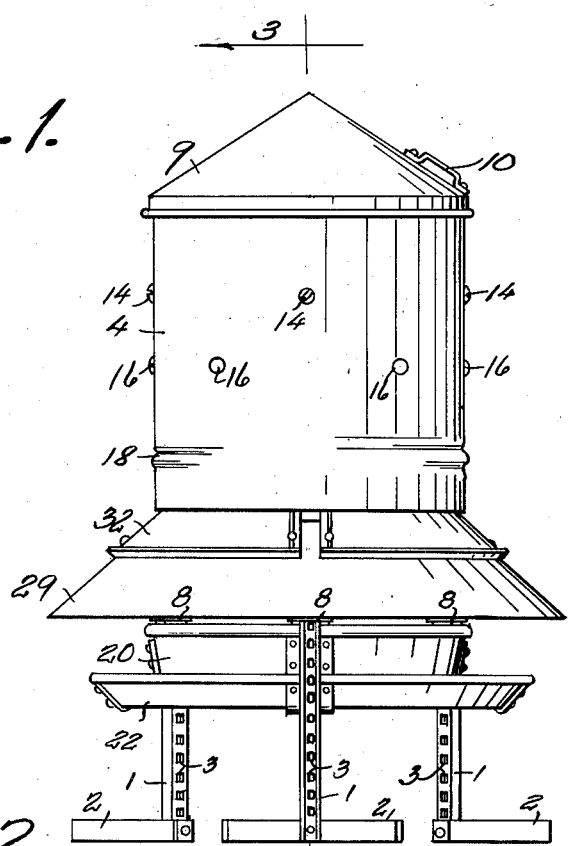
Figure 1 is a view in side elevation of an automatic poultry feeder in which my invention is physically embodied.
Figure 2:
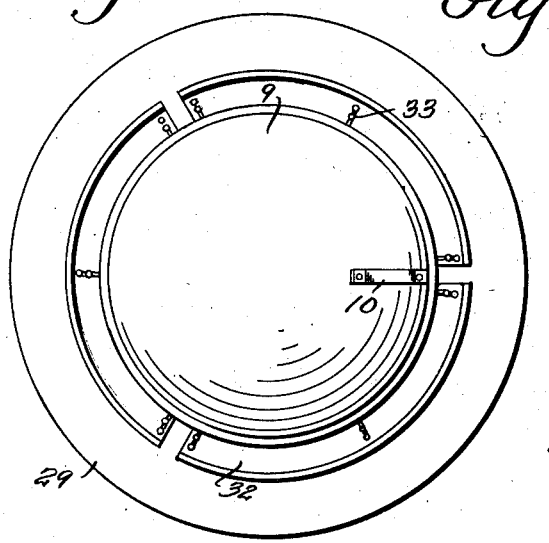
Figure 2 is a top plan view of the appliance.

In the preferred form of the invention shown in the assembly views Figs. 1 and 3 I utilize a number of supporting legs 1, here shown as three, fashioned from channel iron bars and stamped or pressed with series of holes or sockets 3, and each bar or leg is provided with a V-shaped, horizontal foot 2 to provide a stable support for the hopper 4.

The cylindrical hopper is equipped at its lower end with three metal hangers, as 5, that are riveted to the hopper at 6, and these metal strips or hangers depending from the hopper are each provided with vertically spaced integral lugs 7 and 7a for selective insertion in the sockets of the supporting legs. The lug and socket joints between the hangers and the legs are rigidly united by the use of rectangular open center clamps or cam plates 8 that surround the joint and frictionally engage the jointed parts. The height of the hopper may thus be vertically adjusted by the use of the pairs of lugs and sockets, and the joints between the hangers and legs may be secured by the cam plates for the installation of the feeding assembly to accommodate poultry feeding at various heights above the ground level.

The cylindrical hopper or magazine 4 is equipped with a removable conical shaped and flanged cover or lid 9 having an exterior handle 10, and the lid is provided with an interior hook or loop 11 by means of which the removed lid may be suspended in convenient position on the upper edge of the open top of the hopper, while the latter is being supplied with the poultry feed.

The feed deposited through the open top of the hopper is disintegrated and spread outwardly from its center as it falls upon a breaker or spreader 12, of frusto-conical shape that is located in the central portion of the hopper, and supported by cross rods or braces 13, the outer ends of which are attached to the hopper wall as by rivets at 14.

From the central tapered feed-spreader the material falls against and is deflected by a plurality of curved arcuate shaped fins, plates, or shelves 15, that are riveted at 16 against the inner wall of the hopper, and these deflectors direct a portion of the falling material toward the center of the bottom portion of the hopper, while other portions of the material fall directly past the deflectors from the spreader, to separate the granular material.

The feed falling through the magazine or hopper is deposited in an inverted frusto-conical bottom of the hopper, as 17, the upper circular edge of which is seated and retained in an annular interior groove 18 of the hopper, and the tapered bottom is provided with a central cylindrical discharge spout 19 of reduced diameter.

Directly beneath the discharge spout the feeding assembly is mounted in horizontal position, and adjustable to the varying heights of birds, so that the assembly is readily accessible from all sides for feeding purposes. The feeding assembly includes a comparatively shallow circular pan 20, the bottom of which near its outer periphery is provided with an annular series of perforations as 21, for screening small particles of foreign material that is rejected by the birds, such as weed seeds and dirt.

The imperforate central portion of the feed pan is mounted directly upon the top of a central dome 22 of a sectional waste pan 23 that forms an annular trough into which the rejected material is screened from the feed pan, and in which scattered feed is also caught to prevent waste. The feeding assembly including the waste pan, is supported by the co-acting legs and hangers of the feeder so that it may be elevated or lowered for the convenience of chicks as well as older birds, and for this purpose the flanged pan is slotted at 24 to slip up over the lower ends of the hangers and lugs 7a, and one of the cam plates 8 is used at each joint for securing the assembly in rigidly adjusted position.

The feed pan is equipped with a loosely seated agitator and guard that is actuated by the beaks of the birds to separate the granular feed, and as best shown in Fig. 9 this readily movable agitator comprises a bottom base ring 25 and an upper concentric ring 26 that are rigidly united by means of an annular series of radially arranged wire pins 27 that are welded to the rings. By contact from the beaks of the feeding birds the agitator and guard may be lifted and lowered, and pushed and pulled, thereby constantly agitating the feed and separating the grains.

The annular bottom or trough of the waste pan may be provided with an abrasive lining 28 made up of three sections, which may readily be placed in position, for the purpose of wearing off the sharp ends of the bird beaks when feeding in the waste trough, thus eliminating the menace of feather-pulling on the part of the birds.

A wind shield and rain guard is provided for the feeding assembly, which includes a frusto-conical hood 29 of ample size to slip down over the exterior of the hopper, and the upper circular edge of the hood or canopy is equipped with a bead 30 that rests upon and is supported by the three lugs 31 struck from the hangers and projecting laterally therefrom. The main portion of the hood is located below the lower circular edge of the hopper, and an upper extension of the hood is projected from the hood into the space between the tapered bottom of the hopper and its circular edge, to provide a complete enclosure, open at the bottom, but surrounding the feeding assembly. The extension as shown is made up of three sections as 32, each of which is fashioned with radially arranged slots 33, and headed pins or rivets 34 are passed through the hood and the extension-sections to retain the latter in fixed position.

An auxiliary waste catcher or annular trough 35 of larger diameter than the waste pan 23 may be attached to the pan in three sections, by straps or brackets 36 that are riveted to the waste pan 23.

For controlling the feeding times and access to the feed pan, as for morning and evening feeding of the chickens, the feed pan is provided with a removable cover made up of two flat segmental sections 37, 37, that surround the discharge spout 19, rest on the top flange of the feed pan, and are detachably fastened by resilient cleats or snap fasteners 38 that engage against the inner surface of the flange of the feed pan.

Having thus fully described my invention, what I claim as new and desire to secure by Letters Patent is:

1. In an adjustable poultry feeder, the combination with a magazine hopper having a feeding assembly mounted in its lower end, a plurality of hangers depending from the hopper of a plurality of supporting legs each having a vertical series of sockets, a pair of integral locking lugs projecting from each hanger, and detachable cam means surrounding the hangers and legs for locking the lugs in the sockets.

2. In an adjustable poultry feeder, the combination with a magazine hopper having a feeding assembly at its lower end, a plurality of hangers depending from the hopper, and vertically spaced locking lugs on each hanger, of a plurality of supporting legs each having a vertical series of sockets, means on the hangers and feeding assembly for supporting the latter, and detachable cam means surrounding the hangers and legs for locking the lugs in selected sockets.

3. In an adjustable poultry feeder, the combination with a feed hopper having a feeding assembly at its lower end, a plurality of hangers depending from the hopper, and vertically spaced lugs on each hanger, of a plurality of supporting legs each having a series of sockets, co-acting means on the hangers and feeding assembly for supporting the latter, and rectangular open-center cam plates surrounding the hangers and legs locking the lugs in selected sockets of the legs.

ARTHUR J. BERGERON.

REFERENCES CITED

The following references are of record in the file of this patent:

UNITED STATES PATENTS

| Number | Name | Date |
| --- | --- | --- |
| 177,778 | Winterschied et al. | May 23, 1876 |
| 390,103 | Wallace et al. | Sept. 25, 1888 |
| 570,569 | Smith | Nov. 3, 1896 |
| 980,496 | Crockford | Jan. 3, 1911 |
| 1,027,881 | Mills | May 28, 1912 |
| 1,114,482 | Johnson | Oct. 20, 1914 |
| 1,156,428 | Myers | Oct. 12, 1915 |
| 1,167,385 | Clough | Jan. 11, 1916 |
| 1,377,543 | Alm | May 10, 1921 |
| 1,583,828 | Hayes | May 11, 1926 |
| 1,632,738 | Lord | June 14, 1927 |
| 2,163,186 | Bergeron | June 20, 1939 |
| 2,165,968 | Hill | July 11, 1939 |
| 2,372,544 | Bowman et al. | Mar. 27, 1945 |